Sept. 9, 1958 R. F. BOERSMA 2,851,150
SHUTTLE CONVEYOR AND TRIPPER STATION THEREFOR
Filed Aug. 23, 1954 5 Sheets-Sheet 3

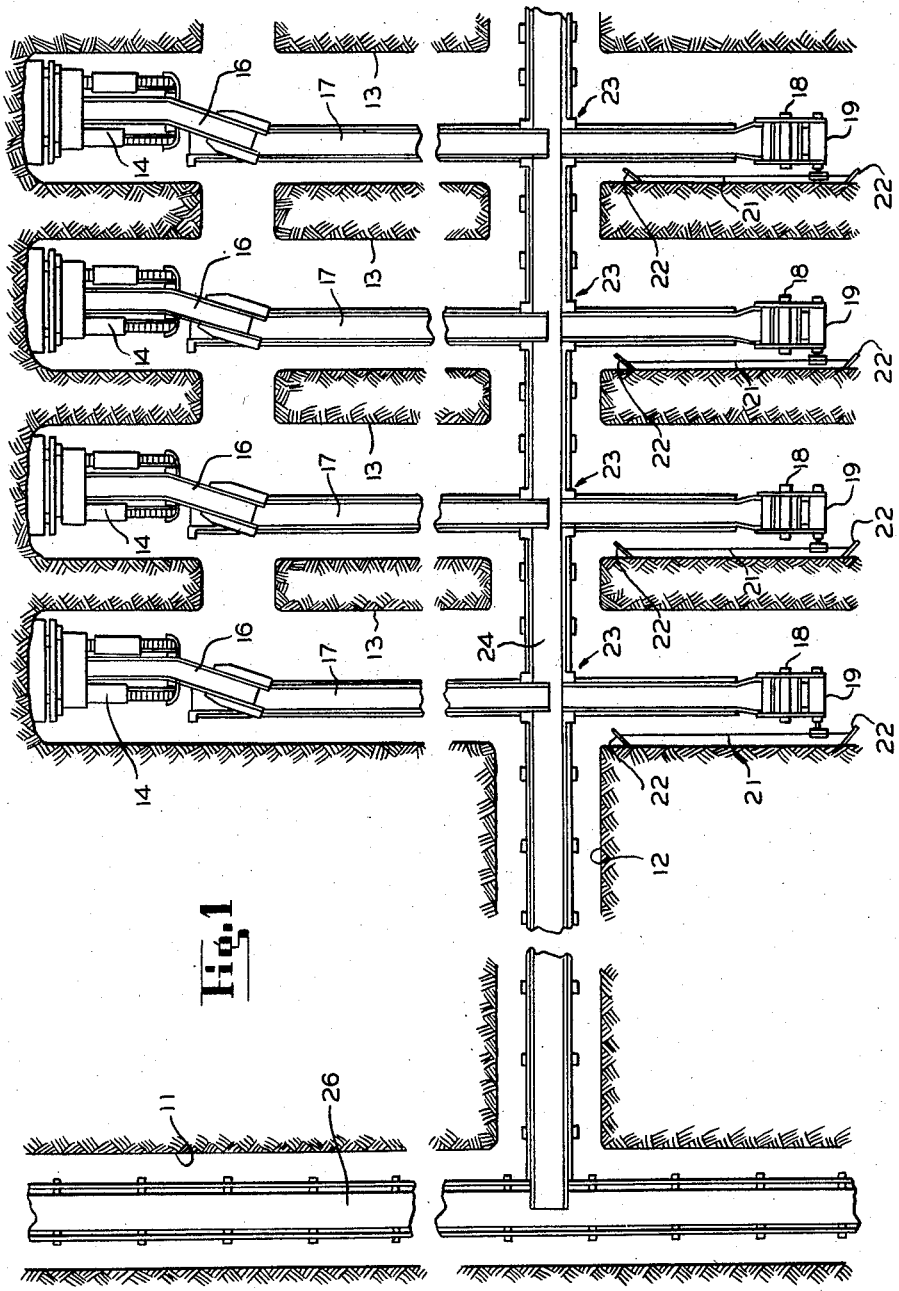

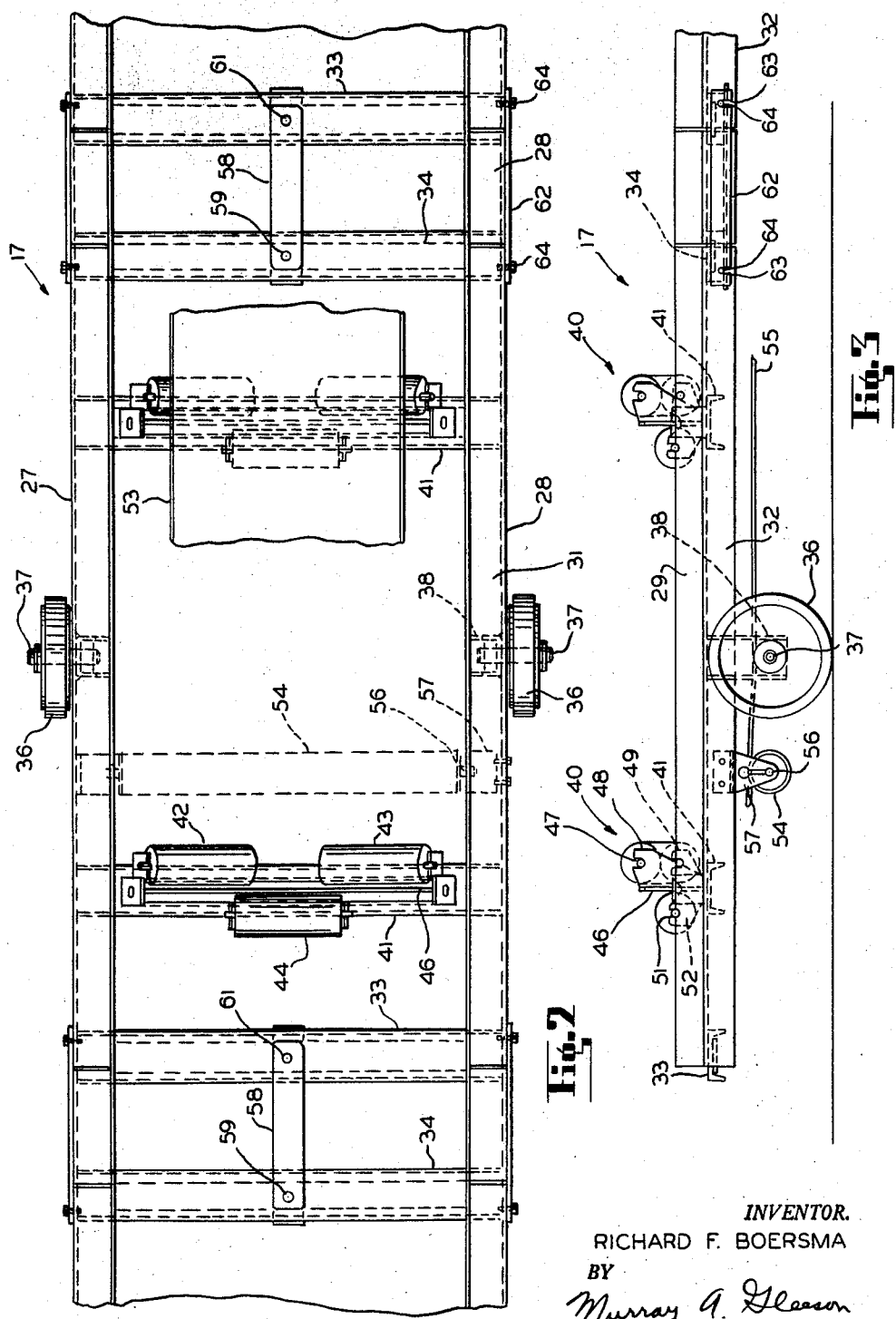

INVENTOR.
RICHARD F. BOERSMA
BY
Murray G. Gleeson
ATTORNEY

United States Patent Office 2,851,150
Patented Sept. 9, 1958

---

2,851,150

SHUTTLE CONVEYOR AND TRIPPER STATION THEREFOR

Richard F. Boersma, Worth, Ill., assignor to Goodman Manufacturing Company, Chicago, Ill., a corporation of Illinois Application August 23, 1954, Serial No. 451,401

3 Claims. (Cl. 198—186)

---

This invention relates generally to improvements in apparatus for the transport of coal or other mineral in a mine underground, and more particularly to apparatus for transferring material from one means of transportation to another.

One of the principal objects of this invention is to provide a combination shuttle conveyor and tripper station movable with respect to such shuttle conveyor, the tripper station being arranged to discharge upon a cross conveyor while the shuttle conveyor may be moving with respect to the cross conveyor.

Another object is to provide a transfer station for a shuttle conveyor, so arranged as to follow up and down movements of the shuttle conveyor as it moves with respect to the transfer station, yet so arranged that the discharge onto the cross conveyor at the tripper station will not be effected by such movement.

Other objects and important features of the invention will be apparent from a study of the following specification taken with the drawings which together show a preferred embodiment of the invention and what is now considered to be the best mode of practicing the principles thereof. Other embodiments of the invention may be apparent to those having the benefit of the teachings herein, and it is therefore intended that the scope of the invention not be limited by the precise embodiment herein shown, other embodiments being intended to be reserved especially as they fall within the purview of the appended claims.

In the drawings:

Fig. 1 is a schematic plan view of a coal mine wherein the operations may be carried on by the room and pillar method, and illustrating schematically a shuttle conveyor and tripper station therefor according to the present invention;

Fig. 2 is a plan view of one of a number of shuttle conveyor sections which when connected make up a shuttle conveyor shown in Fig. 1;

Fig. 3 is an elevation view thereof;

Figure 4:
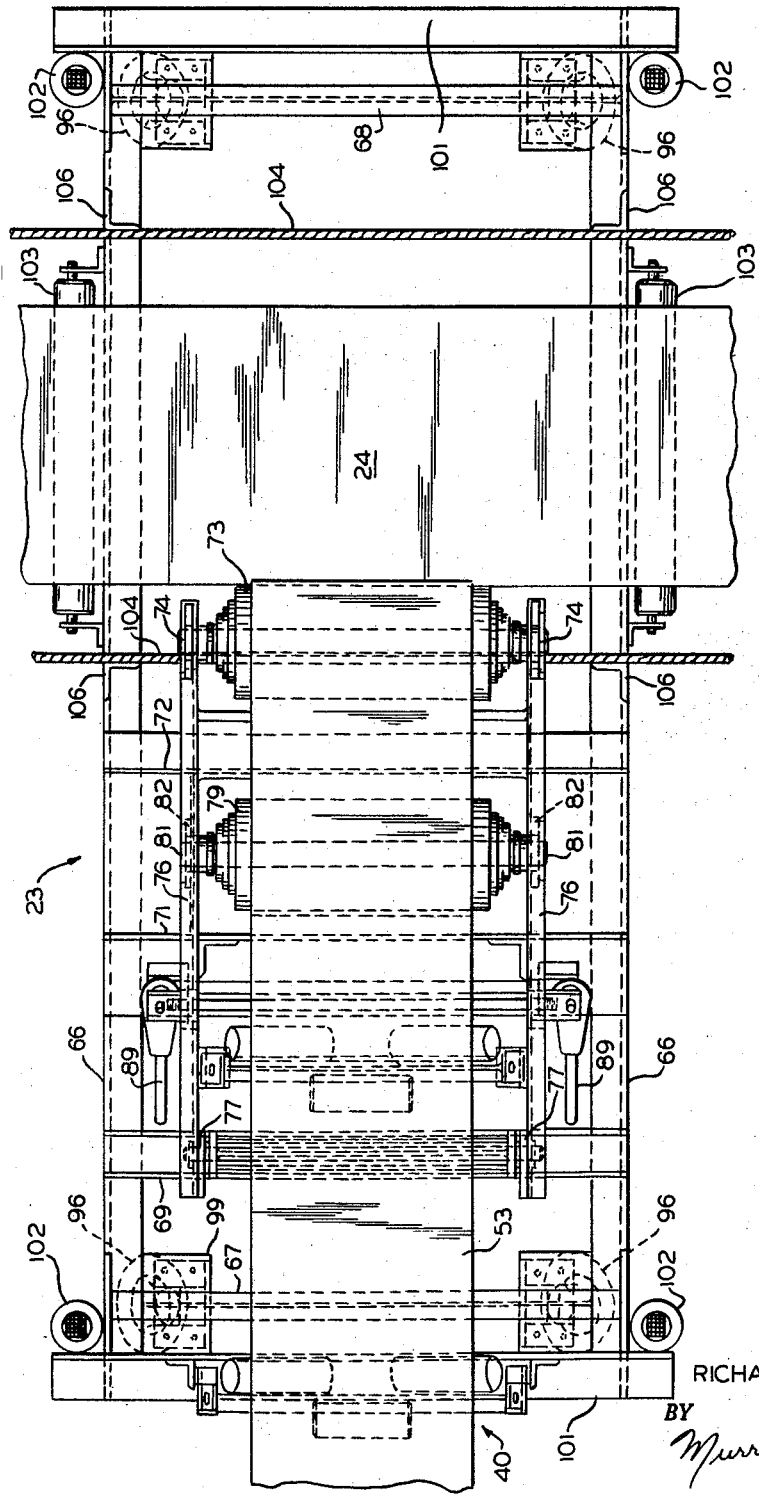
Fig. 4 is a plan view of a tripper station adapted to move with respect to the shuttle conveyor shown in Figs. 2 and 3, such tripper station being shown in position for discharge upon a cross entry conveyor shown in Fig. 1.

Referring now to Fig. 1 of the drawings, there is shown schematically an underground mine wherein the operations are carried on by the room and pillar method. Such a mine may include a main entry 11 which is intersected by a cross entry 12. A plurality of rooms 13 extend substantially at right angles to the cross entry 12 and in each of said rooms a mechanical miner indicated generally by the reference numeral 14 is disposed and is adapted to cut coal or other mineral from the solid seam thereof in a continuous operation. Such a continuous miner 14 may be of the type which cuts a pair of overlapping contiguous bores in the solid seam or vein, and of the type as more particularly shown in an application of James Robbins, Ser. No. 264,880, filed January 4, 1952, for Coal Mining Machine, now Patent No. 2,705,624.

Such machines of the type referred to include a discharge boom 16 arranged to discharge the material cut from the seam onto a shuttle conveyor indicated generally by the reference numeral 17. The shuttle conveyor 17 is arranged to advance into the room 13 in accordance with the rate of advance of the continuous miner 14, and in the case here is of the endless conveyor belt type. Power for operating the endless belt of the shuttle conveyor 17 is had by a power unit 18 preferably disposed at a point remote from the continuous miner 14. The power unit 18 of the shuttle conveyor 17 may also include a power winch 19 arranged to cooperate with a cable 21 which is anchored at each end upon roof jacks 22 or the like, the winch 19 being arranged to advance the shuttle conveyor 17 along the cable 21 in accordance with such advance of the mechanical miner 14.

The shuttle conveyor 17 has a tripper station indicated generally by the reference numeral 23 and forming a cooperating part of the shuttle conveyor 17 whereby the conveying reach thereof is reversed in direction, so that the material transported by the shuttle conveyor 17 may be discharged upon a cross entry conveyor 24 disposed in the cross entry 12. The cross entry conveyor 24 is arranged to receive the discharge at the tripper stations 23 of a number of shuttle conveyors 17, and is arranged also to discharge its contents upon a mother belt conveyor 26 located in the main entry 11.

The cross entry conveyor 24 may preferably be of the type disclosed in an application of John R. Madeira, Ser. No. 447,769, filed Aug. 4, 1954 for Endless Conveyors. Referring now to Figs. 2 and 3 of the drawings, the shuttle conveyor 17 is composed of individual wheel mounted sections indicated by the reference numeral 27. Each section 27 is composed of laterally spaced Z-bar members 28 having an upstanding vertical flange 29, an horizontal web member 31 and a downward extending vertical flange 32. The Z-bar sections 28 are maintained in proper spaced relationship by means of channel members 33 and 34, which are welded at their ends to the downward extending flanges 32 of the Z-bar sections 28.

Each of the sections 27 is supported upon wheels 36, and the wheels 36 turn on stub axles 37 extending from a bracket 38 welded to the inside of the depending flange 32 of the Z bar sections 28. As seen in Fig. 3 the bracket 38 extends below the flange 32 in the manner shown.

Each of such shuttle conveyor sections 27 has a pair of troughing roller assemblies indicated generally by the reference numeral 40, and these are mounted upon additional channel shaped cross members 41 which span the distance between the flanges 32. Each of the troughing roller assemblies 40 include spaced inclined troughing rollers 42 and 43 and a central load supporting roller 44. These are mounted upon a T-bar 46 supported on the cross channel member 41. The inclined rollers 42 and 43 are mounted upon idler shafts 47 which are supported at each end upon spaced brackets 48 and 49 extending from the T-bar 46. The central load supporting roller 44 is similarly mounted upon an idler shaft 51 which is supported at each end on a bracket 52 extending from the T-bar 46.

The troughing roller assemblies 40 afford a means of support for the conveying reach 53 of a conveyor belt of the shuttle conveyor 17, and the return reach 55 of such belt is supported on each section 27 upon an idler return roller 54 turning upon an idler shaft 56, the ends of which are mounted in brackets 57 extending from the flange 32 of the Z-bar section 28.

The endless conveyor belt comprising the conveying reach 53 and the return reach 55 is driven from the power unit 18 seen in Fig. 1. All of the conveyor sections making up the shuttle conveyor 27 are arranged to be locked together so as to move in a straight line upon the wheels 36. However, the means for enabling the conveyor sections to be so locked together may be removed from the assembly so that the entire shuttle conveyor can be pulled in a mine and enabled to make the necessary turns in moving from one room to another, as the occasion may arise.

Each of the conveyor sections 17 is thus arranged to be connected to an adjacent section by means of a tow bar 58. The tow bar 58 has a pin connection at 59 to the end channel 34, and a similar pin connection 61 to the end channel 33 of an adjoining conveyor.

The conveyor sections 27 are arranged to be locked together so that the entire assembly may move in a straight line, and such means comprises a section of Z-bar 28 which is welded to a coupler bar 62 having a slot 63 at each end thereof. The coupler bar 62 may be held firmly against the downward extending flange 32 of each of the adjoining conveying sections 27 by means of cap screws 64 at the end of each conveyor section.

It will thus be seen that when the links 62 are in place the conveyor sections 27 will be held together rigidly, and that the sections will be connected so as to prevent misalignment of the conveying reach 53 and the return reach 55.

The material carried by the shuttle conveyor 17 is arranged to be discharged upon the cross entry 24 seen in Fig. 1, and to this end the conveying reach 53 of the shuttle conveyor 17 is reversed in direction at the tripper station 23 seen in Fig. 1. The tripper station 23 includes a pair of laterally spaced angle members 66, see particularly Figs. 4, 5 and 6. The angle members 66 are arranged to be maintained in proper spaced relationship by means of I-beam members 67 and 68, intermediate channel members 69 and other intermediate angle members 71 and 72.

The conveying reach 53 of the shuttle conveyor 17 is arranged to be reversed in direction at the tripper station 23 around an idler pulley 73 which is journaled at each end in bearings 74 mounted at the end of a pair of spaced channel shaped arms 76 arranged to pivot at the lower end thereof about a shaft 77 supported at each end upon members 78 extending upward from and near the ends of the cross channel member 69.

The conveyor reach 53 after being reversed in direction at the idler pulley 73 is reversed in direction once more about an idler pulley 79 mounted upon a shaft 81 supported in bearings 82 held in vertical plates 83 welded to the vertical flanges of the cross member angles 71 and 72.

The arms 76 afford a means of support for an apron 84 mounted to brackets 86 depending from the end of the spaced arms 76 to minimize spillage at the transfer to the cross entry conveyor 24. Spillage is also minimized by an apron 87 which is mounted to a bracket 88 on the other side of the belt of the cross entry conveyor.

The arm 76 supporting the pulley 73 is arranged to be raised and lowered with the shaft 77 as a fulcrum point by means of a screw type jack 89 which cooperates with a screw of opposite hands 91 engageable with a nut 92 on the arms 76 and a similar nut 93 but of opposite hand held in a bracket 94 supported upon the cross angle 71.

The tripper station thus far described is arranged to move upon the shuttle conveyor 17 and to be guided thereby. Accordingly, the tripper station 23 has wheels 96 arranged to turn on stub axles 97 secured to a plate 98 extending from angle members 99 welded to the bottom flanges of the I-beams 67 and 68. The wheels 96 are inclined in the manner shown, and are arranged to ride upon the web 28 of the Z-bar members 27 and to be guided by the vertical flange 29 thereof.

Ordinarily the tripper station 23 is maintained in the position shown in Fig. 1, that is in a position overlying the cross entry conveyor 24, and the shuttle conveyor 17 in following the advance of the miner 14 must move upon its wheels 36 beneath the tripper station 23. The tripper station 23 is accordingly held in position but is so arranged as to move up and down in accordance with irregularities in the floor of the room in which the shuttle conveyor 17 is moving, and to move freely in such up and down manner irrespective of the movement of the shuttle conveyor 17.

To this end, the frame members 66 are spanned by angles 101 at each end thereof. The length of such angles 101 is such as to extend beyond the wheels 36 of the conveyor sections 27. The angles 101 and the side angles 66 afford at the intersection thereof a point for locating a jack 102. The jacks 102 may be of the screw type or of the hydraulic type as desired, and are arranged to hold the transfer station 23 against horizontal movement, but to permit the transfer station to have up and down movement on the jacks as previously mentioned.

Figure 5:
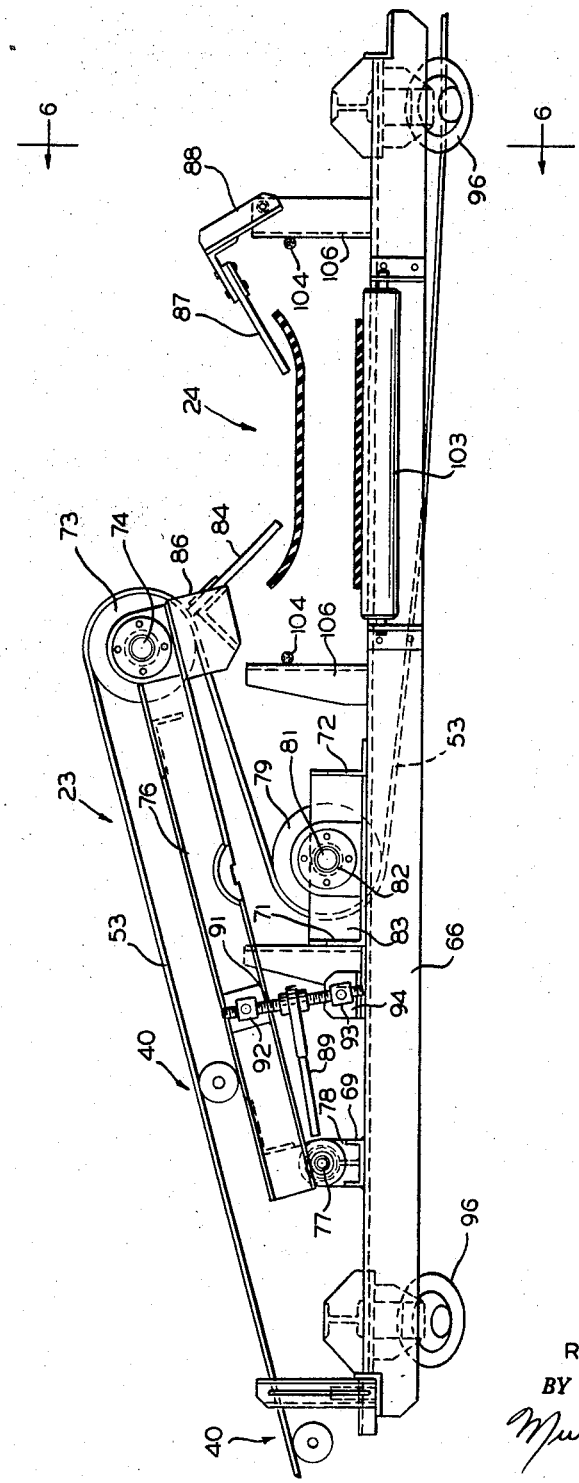
Fig. 5 is an elevation view thereof.

Rollers 103 are supported upon the side angles 66 to support the return reach of the cross entry conveyor 24 which may preferably be of the type as disclosed in the aforesaid Madeira application, and such conveying reach thereof is supported upon catenary cables 104, 104. These are guided at the transfer station 23 by means of angles 106 which extend up from the spaced frame members 66 as seen in Figs. 4 and 5.

Figure 6:
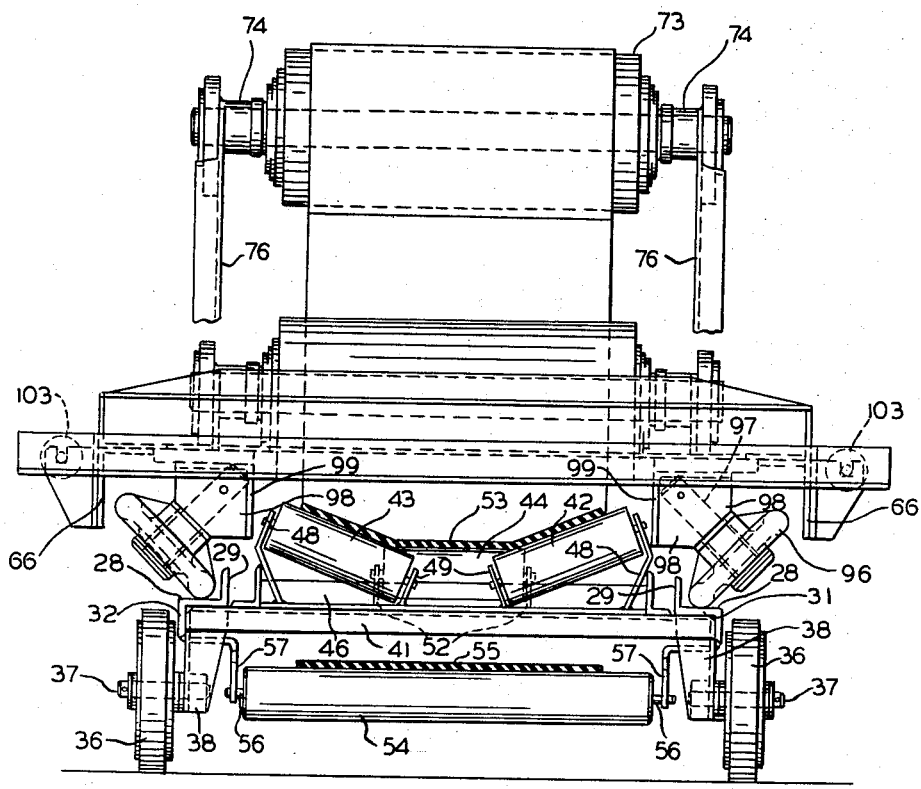
Fig. 6 is an end view of the tripper station shown in Fig. 5, such view being taken substantially along the line 6—6 of Fig. 5 and looking in the direction of the arrows.

As the miner 14 advances into the room 13 the shuttle conveyor 17 is enabled to move with same while the tripper station described with reference to Figs. 4, 5 and 6 remains in the position shown. When the miner 14 has advanced to a further cross entry, not shown, the cross entry conveyor shown in Fig. 1 is dismantled and moved to such next cross entry. After dismantling of the cross entry conveyor, the tripper station 23 is readily moved along the shuttle conveyor 17 to the next cross entry, and the operations resumed as previously described.

In such an operation the shuttle conveyor 17 and the tripper station 23 need not at any time be dismantled, and once moved to the next cross entry the apparatus is in condition for a set of operations as previously described.

While the invention has been described in terms of a preferred embodiment thereof it is not intended that its scope be limited by the precise embodiment herein shown, such other embodiments being intended to be reserved especially as they fall within the scope of the claims here appended.

I claim as my invention:

1. The combination of a shuttle conveyor and transfer station therefor comprising a series of connected conveyor sections including ground engaging wheels on each section, an endless conveyor belt movable longitudinally of such connected sections, a tripper station mounted on said shuttle conveyor and arranged to move relative thereto comprising a wheeled frame having means thereon for reversing the load carrying reach of said shuttle conveyor for discharge thereof, guide means for the wheels of said tripper station, said guide means forming the side frames of said shuttle conveyor sections, the wheels of said tripper station and said guide means being so related as to prevent lateral shifting of said tripper station, means connecting said shuttle conveyor sections together and forming with said guide means a path for travel of the wheels of said wheeled frame when said shuttle conveyor and said tripper station move relative to each other, and means for holding said tripper station against movement in a horizontal direction during the horizontal movement of said shuttle conveyor, and for enabling the tripper station to have vertical movement in accordance with the irregularities of a mine floor over which the shuttle conveyor travels.

2. The combination of a shuttle conveyor and transfer station therefor comprising a series of connected conveyor sections including ground engaging wheels on each section, an endless conveyor belt movable longitudinally of such connected sections, a tripper station mounted on said shuttle conveyor and arranged to move relative thereto comprising a wheeled frame having means thereon for reversing the load carrying reach of said shuttle conveyor for discharge thereof, guide means for the wheels of said tripper station, said guide means forming the side frames of said shuttle conveyor sections, the wheels of said tripper station and said guide means being so related as to prevent lateral shifting of said tripper station, and means for holding said tripper station against movement in a horizontal direction during the horizontal movement of said shuttle conveyor, and for enabling the tripper station to have vertical movement in accordance with the irregularities of a mine floor over which the shuttle conveyor travels.

3. The combination of a shuttle conveyor and transfer station therefor comprising a series of connected conveyor sections including ground engaging wheels on each section, an endless conveyor belt movable longitudinally of such connected sections, a tripper station mounted on said shuttle conveyor and arranged to move relative thereto comprising a wheeled frame having means thereon for reversing the load carrying reach of said shuttle conveyor for discharge thereof, guide means for the wheels of said tripper station, said guide means forming the side frames of said shuttle conveyor sections, the wheels of said tripper station and said guide means being so related as to prevent lateral shifting of said tripper station, and means connecting said shuttle conveyor sections together and forming with said guide means a path for travel of the wheels of said wheeled frame when said shuttle conveyor and said tripper station move relative to each other.

References Cited in the file of this patent

UNITED STATES PATENTS

| | | |
|---|---|---|
| 1,403,921 | Stuart | June 17, 1922 |
| 1,548,278 | Phillips et al. | Aug. 4, 1925 |
| 1,575,655 | Stinson | Mar. 9, 1926 |
| 2,078,863 | Lundbye | Apr. 27, 1937 |
| 2,250,933 | Manierre | July 29, 1941 |
| 2,633,974 | Jackson | Apr. 7, 1953 |
| 2,689,034 | Smith | Sept. 14, 1954 |